Sept. 20, 1966    R. M. PAGE    3,274,599
RADIO DIRECTION FINDER SYSTEM
Filed Feb. 21, 1952    2 Sheets-Sheet 1
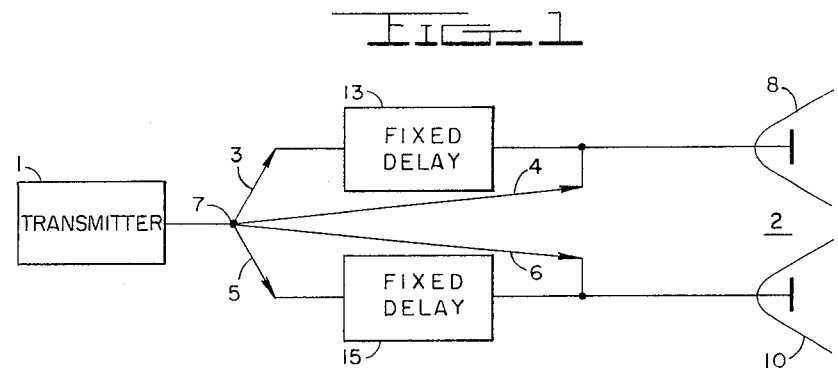
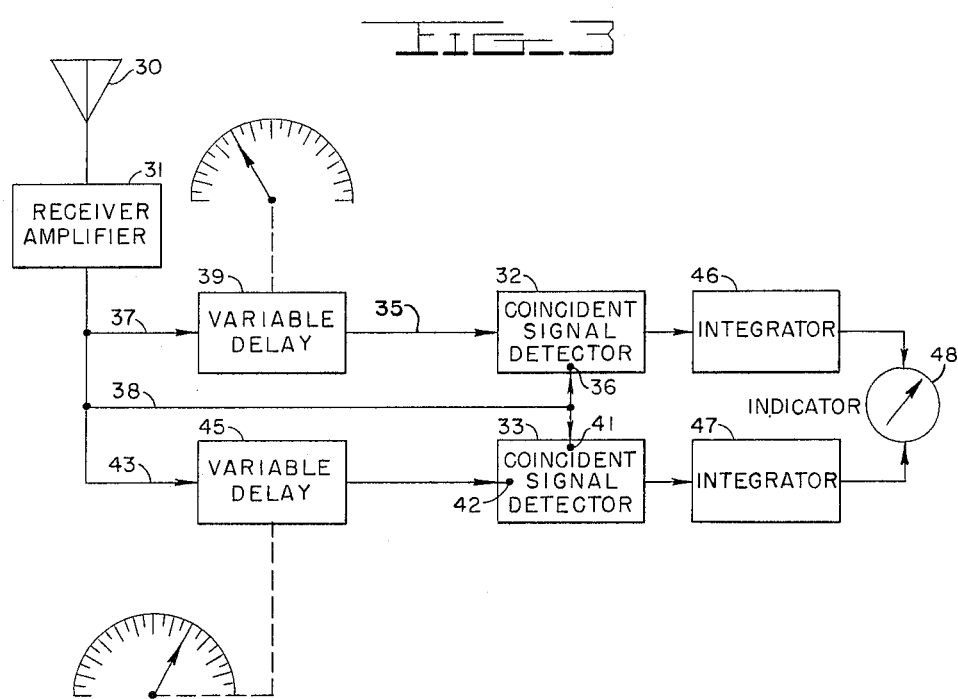
INVENTOR
ROBERT M. PAGE
BY
ATTORNEYS

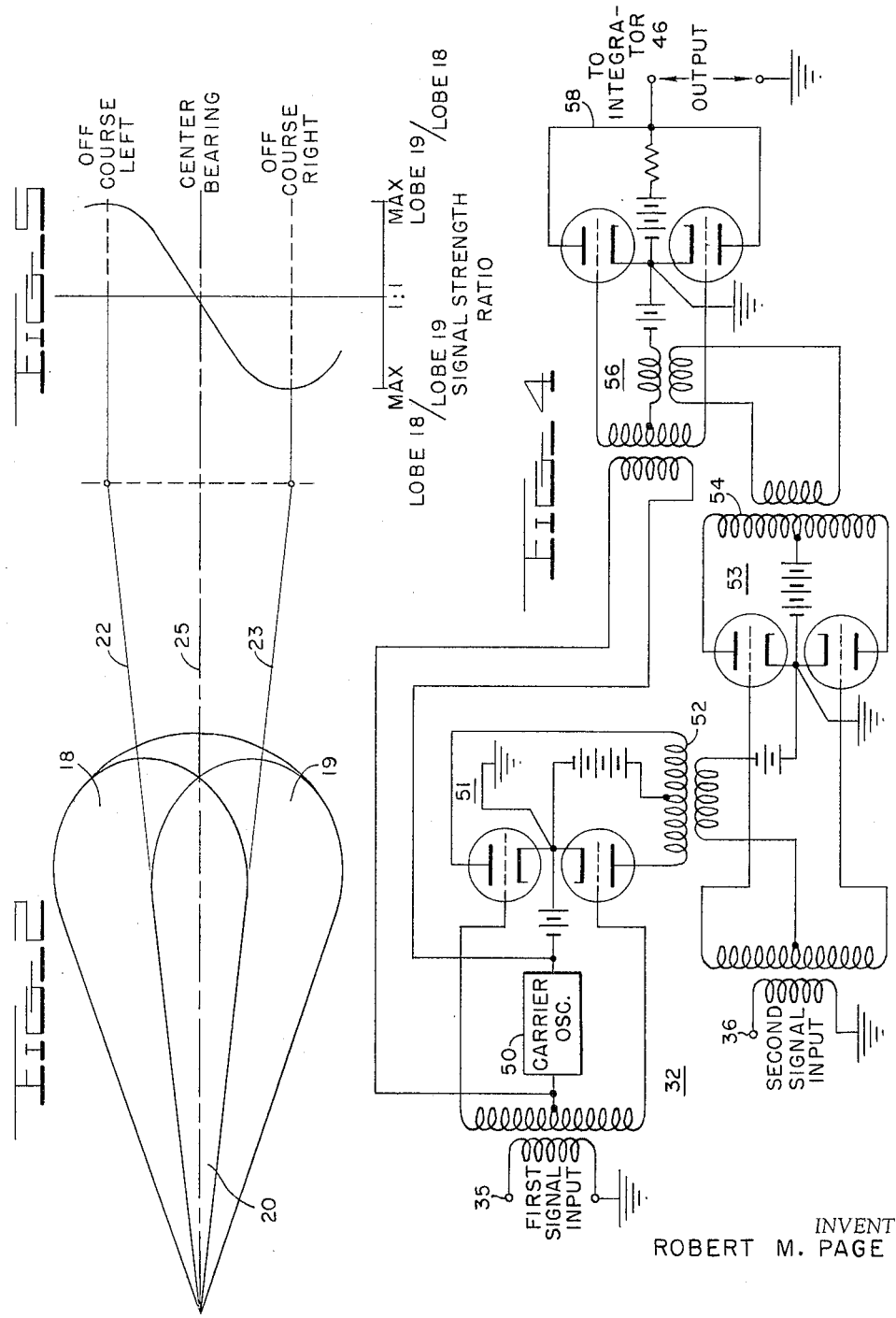

3,274,599
RADIO DIRECTION FINDER SYSTEM
Robert M. Page, Camp Springs, Md.
(6715 Norview Court, Springfield, Va. 22150)
Filed Feb. 21, 1952, Ser. No. 272,875
10 Claims. (Cl. 343—112)

The invention described herein may be manufactured and used by or for the Government of the United States of America for governmental purposes without the payment of any royalties thereon or therefor.

This invention relates to radio direction finding systems. More particularly it relates to direction finding systems of the type wherein the azimuth of a vehicle from a reference point can be determined in terms of the characteristics of a signal received at the vehicle when on that azimuth.

Radio direction finding systems enabling azimuth determination are known to the prior art. One familiar example of such systems is the aircraft homing equipment carried by aircraft carriers for transmitting in different azimuth sectors azimuth-identifying signals consisting of different respective letters of the alphabet. Reception of one of the letter designating signals by an aircraft within range of the carrier homing equipment immediately provides the pilot with a rough indication of his azimuth from the carrier. Use of such systems to define airlanes for the convenience of commercial aircraft is also well known. A familiar example of such a navigational aid is the system wherein opposite sides of a selected flight path are defined by reception at the aircraft of either and *a* or *n* Morse code signal respectively, and the indication at the aircraft that it is on the flight path consists of a blending of the *a* and *n* signals to form a continuous tone.

A principal disadvantage of such systems is that a given azimuth identifying signal is usually transmitted on a single fixed carrier frequency, and an azimuth determination made thereby is susceptible to inaccuracy due to interference from extraneous signals and to distortion of the propagation paths of the transmitted signal. Such distortion may be caused, for example, by the presence in the signal propagation area of a large signal-reflecting surface, such as a mountain, or the surface of the sea. These foreing energy-reflecting surfaces, by redirecting a portion of the transmitted signal energy, shift the actual transmitted signal radiation pattern out of its normal orientation relative to the transmitting antenna by an amount and direction dependent on the carrier frequency being employed. Such factors as weather conditions will vary the amount of such reflection and produce a resultant variable error which cannot be anticipated.

The present invention avoids the above disadvantages by enabling the use of azimuth identifying signals which have random frequency composition and extend over a wide bandwidth. With a signal of random frequency composition, distortion of the radiation pattern by a given reflecting surface averages to zero, and the azimuth errors caused by the distortion are thereby eliminated. Moreover the wide bandwidth signals are received in a highly selective manner, which enables substantial discrimination against extraneous signal interference.

One object of this invention, therefore, is to provide a radio direction finding system wherein azimuth identifying signals are transmitted from a reference point for reception by a remote vehicle to enable determination at the vehicle of its azimuth from the reference point.

Another object is to provide a radio direction finding system for azimuth determination wherein azimuth identifying signals of random frequency composition are employed.

Another object is to provide a radio direction finding system wherein a continuous determination of azimuth can be obtained independently of variation in signal amplitude.

Another object is to provide a radio direction finding system for azimuth determination wherein inaccuracies caused by topography are minimized.

Another object is to provide a radio direction finding system for azimuth determination wherein extraneous signal interference is minimized.

Another object is to provide a radio direction finding system wherein changes in calibration due to changes in reflective properties of terrain are minimized.

Another object is to provide a radio direction finding system for a vehicle, employing azimuth identifying signals of random frequency composition for reception at the vehicle, wherein the effects of distortion of the vehicle antenna radiation pattern due to the configuration of the vehicle are minimized.

Other objects and features of this invention will appear more fully hereinafter from the following detailed description together with the accompanying drawings, which disclose one embodiment of the invention. It is expressly understood, however, that the drawings are designed for purposes of illustration only, and not as a definition of the limits of the invention, for which definition reference should be made to the appended claims.

In the drawings, wherein like reference characters refer to like elements in all the figures:

FIGURE 1 is a block diagram of a signal transmission means constructed in accordance with the present invention.

FIGURE 2 is a diagrammatic representation of the principal lobes of the radiation patterns of the transmitting antennae shown in FIGURE 1.

FIGURE 3 is a block diagram of receiving means for use in conjunction with the apparatus of FIGURE 1.

FIGURE 4 is a schematic diagram of a portion of the receiving means shown in FIGURE 3.

FIGURE 5 is a graphical representation of variation of received signals with change in azimuth of the receiving means.

The direction finding system herein disclosed makes use of time domain communication principles. That is, different respective azimuth sectors are characterized by signals which are analyzed or which can be analyzed in terms of their displacement on a time scale rather than their displacement on a frequency, amplitude, or phase scale. Since only a time scale displacement is used to derive information from the transmitted signals, their carrier frequency may vary in a random manner. Variations in amplitude and phase characteristics of the transmitted signals are also of no consequence.

A radio direction finding system constructed in accordance with this invention consists essentially of transmission means and receiving means. The transmission means is shown in FIGURE 1. It includes a transmitter 1 and an antenna assembly 2 connected to the transmitter 1 by a plurality of parallel signal paths 3, 4, 5 and 6, which join at point 7. The antenna assembly 2 may consist, as shown, of two adjacent directional antennae 8 and 10, fed separately from the transmitter 1. A single reflective antenna provided with two sources of signals through two separate directive feeding elements may also be used in place of antennae 8 and 10.

Antenna 8 is connected to the transmitter 1 by parallel signal paths 3 and 4. Antenna 10 is connected to transmitter 1 by parallel signal paths 5 and 6. The transmitted output signal is fed simultaneously to all four signal paths 3, 4, 5 and 6, which have equal input impedances. Signal paths 4 and 6 are of equal length, and substantially zero time delay. Signal paths 3 and 5 include respective time delay elements 13, 15, for producing a delay image of the transmitter output signal. The respective delay elements 13 and 15 provide signal delays of unequal amount.

Thus at any one antenna 8 or 10 two identical signals arrive from the transmitter, one displaced from the other in time by the amount of the delay inserted in the respective line 3, 5 to that antenna. This pair of signals, identical in all respects, but spaced in time by a predetermined amount, is propagated outward from its antenna in a radiation pattern having a selected axis of directivity relative to the antenna.

The antennae 8 and 10 are positioned so as to propagate the signals fed to them in two respective directive radiation patterns of identical shape, but slightly different axes of directivity. Signals propagated from antenna 8 are identical in all respects with those propagated from antenna 10, except that the time spacing of the signals of the pair propagated from antenna 8 is different than the time spacing of the pair propagated from antenna 10. Each radiation pattern is thus characterized by the signals fed to the respective antenna 8 or 10 whose radiation field it defines. The two antennae 8 and 10 are mutually oriented so that the main pear-shaped lobes of their radiation patterns partially overlap in the manner of the overlapping radiation pattern lobes of fire control radar equipment. This relationship is shown more fully in FIGURE 2, where lobe 18 defines the main lobe of the radiation pattern of signals propagated from antenna 8, lobe 19 defines the main lobe of the radiation pattern of signals propagated from antenna 10, and area 20 is the area of overlap of the two lobes 18 and 19. The axis of lobe 18 is depicted at 22, while axis of lobe 19 is shown at 23, and 25 represents the centerline of area of overlap 20.

The two antennae 8 and 10 are oriented so that center line 25 of the area of overlap 20 of their respective radiation patterns coincides with a desired reference azimuth. It is desirable that the signal path lengths from point 7 to antennae 8 and 10 be physically equal, so that the antennae will be fed in electrical symmetry, and phase shift between antennae with change of transmitter output will be avoided. This avoids variations in directivity of the overall radiation pattern of antenna assembly 2. Antennae 8 and 10 are also preferably designed for wide band operation, to prevent variations in directivity of lobes 18 and 19 and minimize variations in the size of area of overlap 20 with change in transmitter frequency.

With this arrangement any vehicle such as an aircraft, missile, ship, or the like, provided with means for intercepting the signals propagated from the two antennae 8 and 10, will, when oriented relative to the two antennae within the area of overlap 20 of the lobes 18 and 19, receive both the pair of signals from antenna 8 and the pair of signals from antenna 10. By analogy to the well known practice in the fire control radar art of determining target bearings by comparing target signal strengths in each of two overlapping radiation pattern lobes, a vehicle receiving both pairs of signals can, by comparing their relative amplitudes, determine its azimuth relative to the center line 25 of the area of overlap 20 of the two lobes.

An exemplary receiving means for use in cooperation with the transmission means of FIGURE 1 is shown in FIGURE 3. This receiving means is normally carried in the vehicle whose azimuth is to be determined. It includes an omnidirectional antenna 30, a radio frequency receiver amplifier 31 and two coincident signal detectors 32 and 33. Coincident signal detector 32 has two signal input points 35 and 36, connected to amplifier 31 by respective parallel signal paths 37, 38, one path 37 of which includes a variable signal delay element 39. Detector 33 has two inputs 41, 42, connected to amplifier 31 by respective parallel signal paths 38, 43, one path 43 of which includes a variable signal delay element 45. The output of detector 32 is connected to an integrating device 46. The output of detector 33 is connected to an integrating device 47. A signal strength indicating device 48, of the differential type, provides an indication of the relative amplitudes of output from integrator 46 and integrator 47.

Detectors 32 and 33 are identical, and of the multiplier type: each produces an output by multiplying together the signals fed to its two inputs, so that no output is produced unless there are present simultaneous signals at both inputs.

One form which detector 32 or 33 may take for performing this mulitplication is that of two stages of conventional balanced modulator circuits. Such a circuit is depicted in exemplary form in FIGURE 4, wherein are shown the details of detector 32. A signal to serve as an artificial carrier is locally generated at oscillator 50, FIGURE 4, and modulated in a balanced modulator 51 by the received signal at one of the inputs 35 to the detector. The artificial carrier should preferably be much higher in frequency than the highest frequency component of received signals, to reduce distortion. The output of modulator 51, consisting of sideband components only of the modulated wave, is developed across plate load transformer 52. This output serves as the carrier to be modulated in balanced modulator 53 by the received signal arriving at the other of the inputs 36 to the detector. The output of modulator 53 at plate transformer 54 thus consists of the instantaneous products of the two input signals received by the detector, as modulation on a carrier whose frequency is the same as that of the artificial carrier in modulator 51. By feeding this output signal through a synchronous rectifier 56, synchronized from the same artificial carrier frequency used in modulator 51, the carrier can be removed and the instantaneous product of the two input signals recovered as a variable D.C. voltage in the plate circuit 58 of rectifier 56 without the non-linear distortion incurred in conventional detection. The output of the synchronous rectifier 56 may then be integrated to provide an average product of the two input signals to the coincident signal detector. This integration is accomplished for the two detectors 32, 33 by integrators 46 and 47, respectively, of FIGURE 3.

The operation of the receiving means will now be described. By setting the delay of the delay element 39 at the proper value, the difference in length between path 37 and 38 can be made equal to the time spacing of the pair of signals associated with one lobe 18 of the transmitting station. Conversely, with this delay setting a pair of signals having the spacing which characterizes that one lobe 18 will, when intercepted by the receiving antenna 30, arrive at the two input connections 35 and 36 of the coincident signal detector 32 simultaneously. Likewise the delay element 45 can be adjusted so that a pair of signals having the spacing which characterizes lobe 19 will, when intercepted by antenna 30, arrive at input connections 41 and 42 of coincidence detector 33 simultaneously.

Since, as explained above, each of detectors 32 and 33 develops an output signal responsive only to the simultaneous application of signals to both its inputs, the selective setting or tuning of delay element 39 enables detector 32 to develop an output responsive exclusively to the signals characterizing lobe 18. Likewise the detector 33 develops an output responsive exclusively to signals characterizing lobe 19. The output signal from detector 32, when integrated at 46, is supplied to indicator 48, for comparison with the integrated output signal from detector 33. Since the output from detector 32 signifies an azimuthal position of the receiving means proximate to the azimuth of axis 22 of lobe 18, and the output from detector 33 signifies azimuthal position proximate to the azimuth of axis 23 of lobe 19, comparison of the relative strengths of these two signals will provide an indication of the azimuthal position of the receiving means, relative to the azimuths of axes 22 and 23 and the center line 25 of area of overlap 20. FIGURE 5 shows graphically the relation between vehicle azimuth and the ratio of strengths of signals from lobes 18 and 19.

If the signals fed to the two inputs of detector 32 or detector 33 have the form of rectangular pulses, it will be recognized that some output can be obtained from the detector even though the two pulses do not arrive exactly simultaneously at its two inputs, so long as they overlap to some degree. The extent to which their arrival can vary from exact coincidence and still maintain some overlap, it may be seen, depends on the width of the pulses. Thus the amount which the two inputs to the detector can vary from absolute coincidence is proportional to the width of the pulse signals being received.

The operation of detectors 32 and 33 can be most easily understood in the special case above described where the azimuth identifying signals consist of pairs of rectangular pulses. However, it may be shown mathematically that the considerations above outlined for reception of rectangular pulse transmitted signals apply with equal force when the transmitter output signal is a random amplitude, random frequency-composition signal, such as for example that produced by a spark gap generator. That is, the limits within which two input signals to detector 32 or 33 can vary from absolute coincidence, and still preserve some output from the detector, are inversely proportional to the width of the band of frequencies which make up the transmitter output signal. Thus the delay elements 39 and 45 must be tuned within tolerances which are inversely proportional to the bandwidth of frequency components of the transmitted signal, and the selectivity of the detectors 32 and 33 for time domain signals is directly proportional to this bandwidth.

With this arrangement, it may be recognized that no extraneous non-periodic signals received by antenna 30, or generated within the receiving means at any point on the input side of the delay elements 39 and 45, can drive simultaneously at the two inputs of detector 32 or detector 33. Hence such extraneous signals will not be passed by detectors 32 or 33, and cannot affect the accuracy of the signal strength comparison at indicator 48. Only a pair of non-periodic extraneous signals which instantaneously happen to have the time spacing of signals associated with lobe 18 or 19, or a continuous wave signal whose period is equal to the delay of elements 39 or 45, can pass detectors 32 or 33. Since the reception of such signals is unlikely, the resultant accuracy of the system will be very high.

There has thus been shown and described a radio direction finding system employing time domain communication principles, in which the use of wide band random frequency-composition azimuth identifying signals substantially eliminates interference or errors from extraneous signals and minimizes inaccuracies due to distortions of the propagation path of azimuth identifying signals.

Although only one embodiment of the present invention has been disclosed and described herein, it is expressly understood that various changes and substitutions may be made therein without departing from the spirit of the invention as well understood by those skilled in the art. For example the selected azimuthal sector defined by area of overlap 20 can be made any desired width by varying the orientation or radiation patterns of the transmitting antennas. Also additional signals may be propagated, with different characteristic time spacing, to define additional respective azimuthal sectors, so that the entire 360° may be covered with any number of identified sectors of any desired width. Reference therefore should be had to the appended claims for a definition of the limits of this invention.

What is claimed is:

1. A system for determining the azimuth of a vehicle relative to a reference point comprising transmitter means for generating an output signal of random frequency composition, first and second respective antenna means for radiating signals from said reference point in respective directive patterns having angularly overlapping lobes whose angle of overlap defines a selected azimuthal sector, means supplying said first antenna with a pair of signals each identical to said transmitter output signal and having a first time spacing, means supplying said second antenna with a pair of signals each identical to said transmitter output signal but having a second time spacing, whereupon the radiation patterns of said two antennas are identifiable by the time spacing of the signals in a pair, receiving means in said vehicle for receiving each of said pairs of signals and deriving a respective output voltage proportional to the amplitude of the signals in each of said respective pairs, and means for comparing said respective output voltages to determine the relative azimuthal position of said vehicle within said selected azimuthal sector.

2. A radio direction finding system comprising means for generating a wide band random frequency signal, means for delaying the generated signal a first amount to produce a first image, means for delaying the generated signal a second amount to produce a second image, means for propagating from a reference point said generated signal and said first image as a first spaced pair of signals in a first radiation pattern, means for propagating from said reference point said generated signal and said second image as a second spaced pair of signals in a second radiation pattern with said second pattern overlapping said first pattern in a selected azimuthal sector, and reception means for receiving each pair of propagated signals separately and deriving a voltage indicative of the relative amplitudes of each pair to indicate the relative azimuthal position of said reception means within said selected azimuthal sector.

3. A radio direction finding system comprising means for generating a wide band random frequency signal, means for delaying the generated signal a first amount to produce a first image, means for delaying the generated signal a second amount to produce a second image, means for propagating from a reference point said generated signal and said first image as a first spaced pair of signals in a first direction, means for propagating from said reference point said generated signal and said second image as a second spaced pair of signals in a second direction slightly different than the first, vehicle-mounted reception means remote from said reference point for receiving each pair of propagated signals separately and deriving a voltage indicative of the relative amplitudes of each pair to indicate the azimuthal position of said reception means relative to said two selected directions.

4. A radio direction finding system for determining the azimuth of a vehicle comprising transmission means including means for generating a first pair of identical wide band random frequency signals spaced in time by a first amount, means for generating a second pair of signals each identical with the signals of said first pair but spaced in time by a second amount, means for propagating said first and second pairs of signals from a reference point in respective radiation patterns having slightly different axes of directivity and overlapping in a selected azimuthal sector; reception means including means for producing a first instantaneous output voltage responsive only to the reception of instantaneous signals spaced in time by said first amount, means for producing a second instantaneous output voltage responsive only to the reception of instantaneous signals spaced in time by said second amount, first integrating means for integrating said first instantaneous output voltage, second inegrating means for integrating said second instantaneous output voltage; and means for indicating the relative values of the integrated voltages in said two integrating means to indicate the relative azimuthal position of said reception means within said selected azimuthal sector.

5. In a radio direction finding system for orienting remote vehicles by transmitting in a plurality of different respective directions respective azimuth identifying signals and wherein vehicle-mounted reception means capable of receiving the different azimuth identifying signals separately are employed to determine the relative strengths of signals identfying the different azimuths and thereby determine the azimuthal position of the vehicle relative to said different respective directions, means for generating a wide band random frequency signal, respective means for producing identical images of said generated signal delayed in time by respectively different amounts, respective directive antennae means for propagating in said respective directions respective azimuth identifying signals consisting of said generated signal and a respective one of said time delayed images, omnidirectional receiving antenna means for receiving said propagated signals, respective detector means each responsive only to the reception at said antenna of signals spaced by a respective one of said amounts of time to derive a respective output voltage proportional to signals so spaced, and means for indicating the relative values of said respective output voltages.

6. In a radio direction finding system for orienting remote vehicles by transmitting in a plurality of different respective directions respective azimuth identifying signals and wherein vehicle mounted reception means capable of receiving the different azimuth identifying signals separately are employed to determine the relative strengths of signals identifying the different azimuths and thereby determine the azimuthal position of the vehicle relative to said different respective directions, means for generating a wide band random frequency signal, respective means for producing identical images of said generated signal delayed in time by respectively different amounts, respective directive antennae means for propagating in said respective directions respective azimuth identifying signals consisting of said generated signal and a respective one of said time delayed images, omnidirectional receiving antenna means for receiving said propagated signals, respective detector means for producing instantaneous output voltages proportional to the product of the instantaneous value of received signals spaced in time by said respective amounts, respective integrator means for integrating said respective output voltages, and means for indicating the relative value of said integrated voltages.

7. In a radio direction finding system of the type employing for azimuth determination of a vehicle two signal radiation field patterns each characterized by a respective transmitted signal and overlapping in a selected azimuthal sector and means in the vehicle for receiving simultaneously and comparing the signals characterizing the two patterns to determine the relative azimuthal posion of the vehicle within the selected azimuthal sector, means for producing said respective transmitted signals comprising a transmitter for producing a wide band random frequency-composition output signal, two pairs of signal paths connected to said transmitter output, a first delay element in one path of one of said pairs for delaying said transmitter output signal a first selected amount, a second delay element in one path of the other of said pairs for delaying said transmitter output signal a second selected amount, first signal radiating means connected to said one pair of signal paths for propagating a pair of signals spaced by said first selected amount in one of said radiation field patterns, and second signal radiation means connected to said other pair of signal paths for propagating a pair of signals spaced by said second selected amount in the other of said radiation field patterns.

8. In a radio direction finding system for orienting remote vehicles by transmitting in a plurality of different respective directions respective azimuth identifying signals and wherein vehicle-mounted reception means capable of receiving the different azimuth identifying signals separately are employed to determine the relative strengths of signals identifying the different azimuths and thereby determine the azimuthal position of the vehicle relative to said different respective directions, means for generating a wide band random frequency signal, respective means for producing identical images of said generated signal delayed in time by respectively different amounts, respective directive antennae means for propagating in said respective directions respective azimuth identifying signals consisting of said generated signal and a respective one of said time delayed images, omnidirectional receiving antenna means for receiving said propagated signals, respective delay means for delaying received signals by said respectively different amounts, respective coincident signal detector means responsive only to the simultaneous input of delayed signals from said delay means and undelayed signals from said receiving antenna to produce respective output voltages proportional to said simultaneous input signals, respective integrator means for integrating said respective output voltages, and means for indicating the relative value of said integrated voltages.

9. A radio direction finding system comprising, directive transmitter means for emitting a pair of time displaced signals of random frequency composition in each of two divergent but overlapping unidirectional patterns, the time displacement of the signal pair emitted in one pattern being different from that emitted in the other pattern, reception means including a pair of detector circuits one of which is responsive only to signals having the time displacement of the signal pair emitted in one of the patterns and the other of which is responsive only to signals having the time displacement of the signal pair emitted in the other of said patterns, and means utilizing the outputs from said detector circuits for indicating the position of said reception means relative to said patterns.

10. A radio direction finding system comprising, directive transmitter means for emitting a pair of time displaced signals in each of two divergent but overlapping unidirectional patterns, the time displacement of the signal pair emitted in one pattern being different from that emitted in the other pattern, reception means including a pair of detector circuits one of which is responsive only to signals having the time displacement of the signal pair emitted in one of the patterns and the other of which is responsive only to signals having the time displacement of the signal pair emitted in the other of said patterns, each of said detector circuits being operative to derive an output voltage proportional to the amplitude of the signals received from the respective antenna patterns, and means utilizing the outputs from said detector circuits for indicating the position of said reception means relative to said patterns.

References Cited by the Examiner
UNITED STATES PATENTS

| | | | |
|---|---|---|---|
| 2,429,630 | 10/1947 | Kandoian | 343—110 |
| 2,444,445 | 7/1948 | Isbister | 343—103 |
| 2,449,982 | 9/1948 | De Rosa | 343—106 |
| 2,450,005 | 9/1948 | Labin et al. | 343—106 |
| 2,492,137 | 12/1949 | Dodington | 343—107 |
| 2,531,425 | 11/1950 | Grieg | 343—102 |
| 2,539,905 | 1/1951 | Herbst | 343—107 |

CHESTER L. JUSTUS, *Primary Examiner.*

NORMAN H. EVANS, *Examiner.*